(12) United States Patent
Chang et al.

(10) Patent No.: US 6,704,765 B1
(45) Date of Patent: Mar. 9, 2004

(54) SYSTEM FOR ALLOCATING RESOURCES AMONG AGENT PROCESSES

(75) Inventors: David Yu Chang, Austin, TX (US); George Prentice Copeland, Austin, TX (US); Ambuj Goyal, Amawalk, NY (US); Marc Gregory Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/355,885

(22) Filed: Dec. 14, 1994

(51) Int. Cl.$^7$ ................................................. G06F 9/00
(52) U.S. Cl. ...................................................... 709/102
(58) Field of Search ................................. 395/650, 700; 364/200.8; 709/102, 107

(56) References Cited

U.S. PATENT DOCUMENTS

| | | | |
|---|---|---|---|
| 4,384,322 A | | 5/1983 | Bruce et al. |
| 4,570,220 A | * | 2/1986 | Tetrizk ........................ 364/200 |
| 4,621,359 A | | 11/1986 | McMillen |
| 4,785,396 A | | 11/1988 | Murphy et al. |
| 4,807,109 A | | 2/1989 | Farrell et al. |
| 4,885,684 A | * | 12/1989 | Austin ........................ 364/300 |
| 4,937,737 A | | 6/1990 | Schwane et al. |
| 4,942,602 A | | 7/1990 | Baker, Jr. et al. |
| 4,943,996 A | | 7/1990 | Baker, Jr. et al. |
| 4,949,373 A | | 8/1990 | Baker, Jr. et al. |
| 4,982,187 A | | 1/1991 | Goldstein et al. |
| 4,989,131 A | | 1/1991 | Stone |
| 5,142,675 A | * | 8/1992 | Oi ................................ 395/650 |
| 5,241,628 A | | 8/1993 | Solari |
| 5,253,342 A | | 10/1993 | Blount et al. |
| 5,274,774 A | | 12/1993 | Manber et al. |
| 5,280,591 A | | 1/1994 | Garcia et al. |
| 5,371,896 A | * | 12/1994 | Grove ......................... 395/800 |
| 5,421,013 A | * | 5/1995 | Smith .......................... 395/650 |
| 5,437,032 A | * | 7/1995 | Wolf et al. ................... 395/650 |
| 5,442,791 A | * | 8/1995 | Wrabetz et al. ............. 395/650 |
| 5,471,592 A | * | 11/1995 | Grove ....................... 395/300.3 |
| 5,475,845 A | * | 12/1995 | Orton et al. ................. 395/700 |
| 5,485,626 A | * | 1/1996 | Lawlor ........................ 395/650 |

OTHER PUBLICATIONS

"Computer Dictionary", Microsoft Press, 1994.*

* cited by examiner

Primary Examiner—Sue Lao
Assistant Examiner—A. Park
(74) Attorney, Agent, or Firm—Anthony V. S. England; Jeffrey S. LaBaw

(57) ABSTRACT

A certain number of agents and tokens are created. A first agent that is assigned a request must obtain a token to process the request. The number of agents which may concurrently process requests are limited by preventing an agent from processing a request unless the agent has an assigned token. An additional agent is created after assigning the token to the first agent, provided that an existing agent is not available to wait for a request, and an unassigned token is available for the additional agent. A certain minimum number of agents is defined and an agent is automatically eliminated when the agent completes a request, provided that the number of agents that are assigned tokens exceeds the minimum number of agents.

13 Claims, 8 Drawing Sheets

SYSTEM FOR ALLOCATING RESOURCES AMONG AGENT PROCESSES

CROSS REFERENCE TO RELATED APPLICATIONS

This application is related to co-pending application entitled (1) "System for Coordinating the Assignment of Agent Processes to Data Processing Requests," Ser. No. 08/355,861, filed Dec. 14, 1994 and Ser. No. 08/376,707, filed on Jan. 31, 1995 respectively assigned to the same assignee.

BACKGROUND OF THE INVENTION

1. Field of the Invention

This invention relates generally to parallel processing of data processing requests, and, more particularly, to concurrent processing on a plurality of nodes by interacting processes.

2. Background Art

Due to the increasing speed and decreasing cost of microprocessors, it is increasingly useful to perform parallel processing in multi-node, microprocessor-based computer systems. Applications for parallel processing include numerical calculation and database processing. This processing of numerous applications concurrently among different nodes may be divided into (a) off-line tasks, wherein application requests in a high level language are compiled into a lower level language such as an assembly language, (b) run-time tasks, wherein the concurrent processing of the instructions is coordinated, and (c) system administration, wherein the system is configured and performance is monitored. The invention described herein primarily concerns parallel processing run-time tasks.

The multi-node, microprocessor-based computer systems which perform parallel processing may have a variety of architectures, ranging from systems having elaborate, high speed communication channels and shared memory, to systems with loosely-coupled communication and no shared memory. The present invention concerns the simpler architecture of multi-node systems with loosely-coupled communication and no memory shared among nodes.

SUMMARY OF THE INVENTION

An objective of the invention is to efficiently allocate computer processing resources among a number of concurrent processes ("agents") which share the resources for processing a number of requests.

According to the present invention, the foregoing and other objects are attained by creating a certain number of agents and tokens. A first agent that is assigned a request must obtain a token to process the request. The number of agents which may concurrently process requests is limited by preventing an agent from processing a request unless the agent has an assigned token.

In another aspect of the invention, a second agent is enqueued in a resume agent queue when the second agent is assigned a request and a token is not available so that the second agent may await notification of an available token. The first agent releases the assigned token when the first agent completes the assigned request. The first agent notifies the second agent if the first agent releases the token, so that the second agent may obtain the released token.

In still another aspect of the invention, the first agent releases the assigned token when the first agent suspends processing of a request, if the duration of the suspension has exceeded a certain time limit. The suspension is due to the agent waiting for a resource or an event. The first agent notifies the second agent in the resume agent queue when the first agent releases the token. The first agent enqueues in the resume agent queue after resolution of the suspension, if the first agent has released its assigned token.

In a still further aspect of the invention, an additional agent is created after assigning the token to the first agent, if an existing agent is not available to wait for a request, and an unassigned token is available for the additional agent. A certain minimum number of agents is defined and an agent is automatically eliminated when the agent completes a request, if the number of agents that are assigned tokens exceeds the minimum number of agents. The automatic elimination of an agent may be preempted by a damping function.

The invention is intended to be limited only as defined in the claims. Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims.

DESCRIPTION OF THE INVENTION

Figure 1:
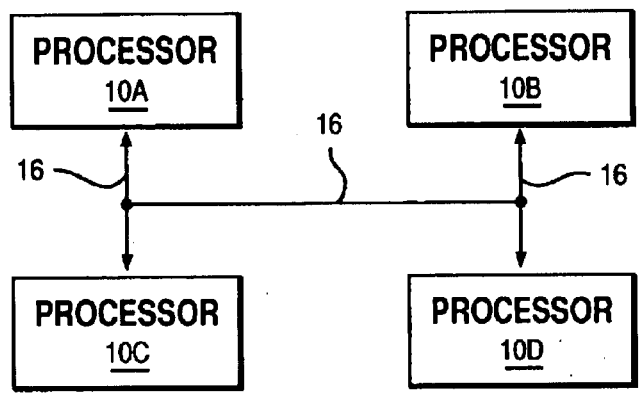
FIG. 1 is a functional block diagram of a plurality of processor units ("nodes") interconnected through a communications link.

FIG. 1 is a block diagram of a multi-processor computer system in which the processing system of the present invention may be advantageously employed. As shown in FIG. 1, the multi-processor computer system comprises a plurality of processor units 10A–10D and communications links 16 for interconnecting the processor units 10A–10D (also referred to as "nodes"). Although only 4 processor units 10A, 10B, 10C and 10D are shown, the actual number of processor units in the network can be more or less.

Figure 2:
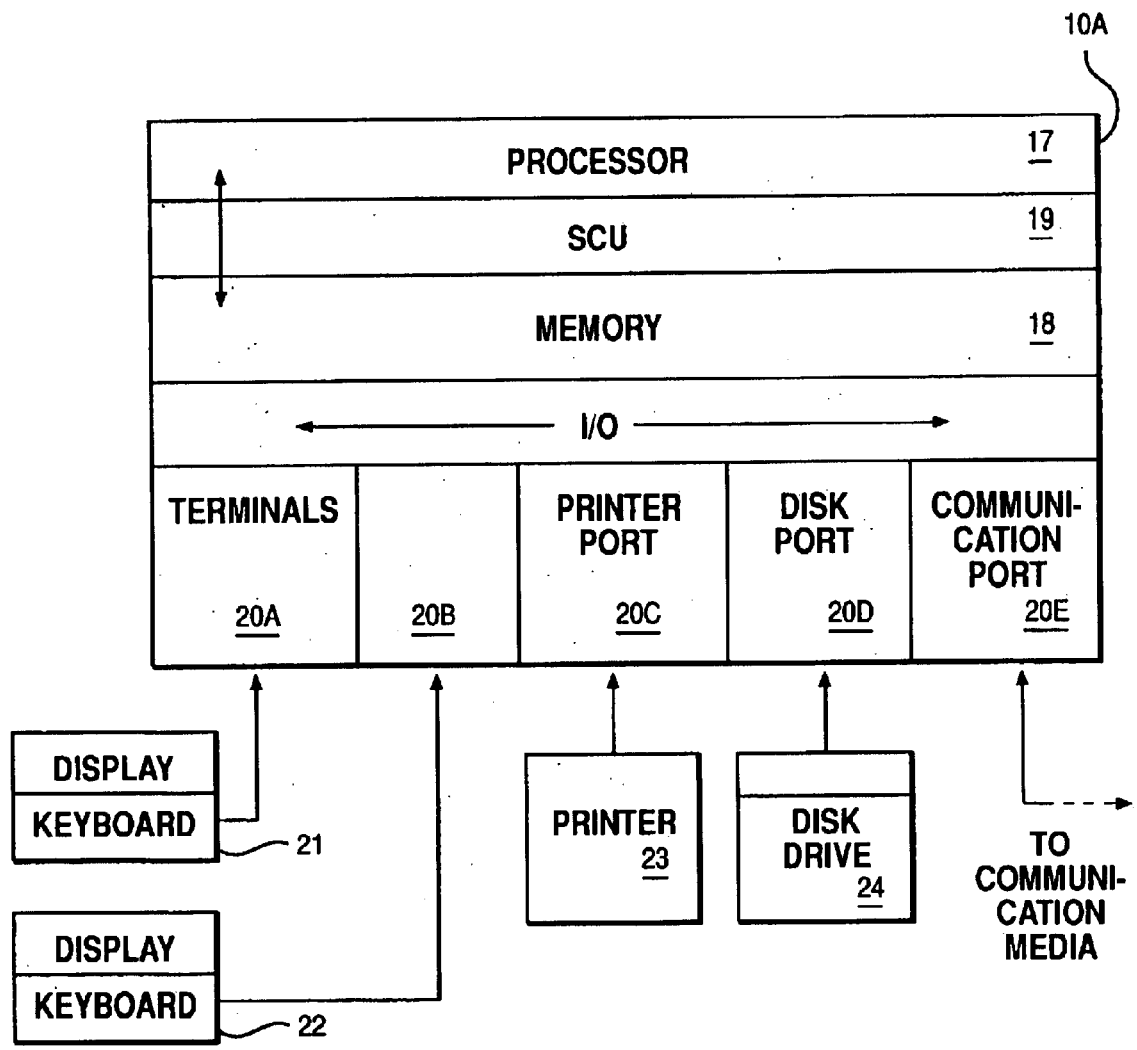
FIG. 2 is a block diagram of one of the processor units shown in FIG. 1, illustrating the various hardware functions that are incorporated into one of the units.

In FIG. 2, a processor unit 10A shown in FIG. 1 is disclosed in more detail. The processor unit may be a personal computer or an engineering work station, such as one having RS/6000 architecture running the IBM AIX™ operating system. ("AIX" is a trademark of IBM corporation.) It should be noted, however, that other architectures and operating systems may be employed in practicing the invention.

The processor unit 10A, may comprise a processor 17, main memory 18, a storage control unit ("SCU") 19, which controls the transfer of data between the processor 17 and memory 18, and a plurality of input/output ports 20A through 20E. In the example depicted in FIG. 2, ports 20A and 20B function to connect display type 21 and 22 terminals to the processor unit 10; port 20C connects a printer 23 to the processor unit 10A; and port 20D connects disk drive memory 24 to the processor unit 10A. Other combinations of storage devices and peripheral devices may be employed in practicing the invention.

A communication input/output adapter, preferably a serial link adapter ("SLA"), is employed to connect the port 20E of the processor unit 10A to the communications link 16 in FIG. 1, so that the node 10A can transfer data rapidly directly to another node.

Figure 3:
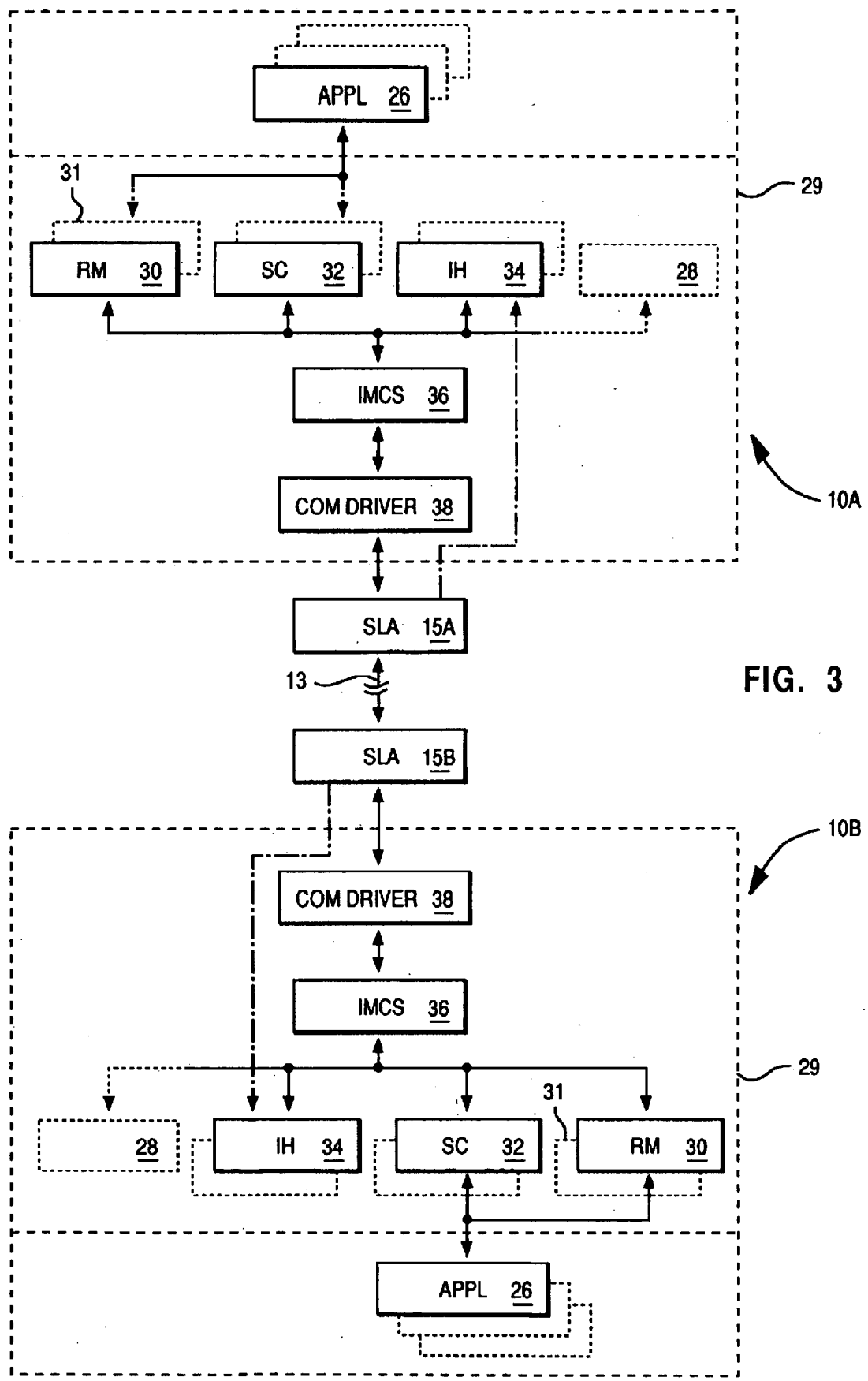
FIG. 3 is a block diagram of two of the processing units shown in FIG. 1, illustrating various software functions that are incorporated in the units and the communication link for sending messages therebetween.

The present invention facilitates loosely coupled communication between the nodes 10A, 10B, etc., where one node does not have direct access to memory of another node. The preferred communications link 16, is a serial link. As shown in FIG. 3, the serial link includes a transmission cable 13, such as a coaxial cable or a fiber optic cable and serial link adapters (SLA) 15A and 15B at each end thereof to interconnect to the respective ports 20E of nodes 10A and 10B. The link 16 fetches the data from the memory 18 of one processor unit 10A and deposits it in the memory 18 of another processor unit 10B. The serial link adapters 15A and 15B implement a link level device protocol which ensures that the data transfer takes place correctly. There are numerous protocols which can be used with the link 16, including protocols such as ethernet or token ring.

Processor 17 (FIG. 2) may be a Power PC™ microprocessor, for example; however, the invention is not limited to any particular hardware. ("PowerPC" is a trademark of IBM Corporation.)

In FIG. 3, the software resources associated with each node 10A and 10B may include a plurality of applications software 26 built on top of a plurality of operating system services 28 in the operating system 29. These system services 28 include various resource managers 30, which allocate the hardware resources of the node 10, system calls 32 which service the requests of applications software 26 for services such as file access, and interrupt handlers 34 which react to asynchronous events such as the completion of an input/output event. Resource managers 30 may include a lock manager or a virtual memory manager 31.

These essential system services 28 are commonly described as being part of the kernel of the operating system 29. The kernel typically includes only the basic functions of the operating system 29 without which the operating system is not available or which may affect all the users or the state of the system and are hence privileged. Hence, the kernel must be reliable, and access to the kernel must be controlled. There are other operating system components, such as compilers and utilities, which do not require privileges to perform their services. As a result, they are not part of the kernel.

Figure 4:
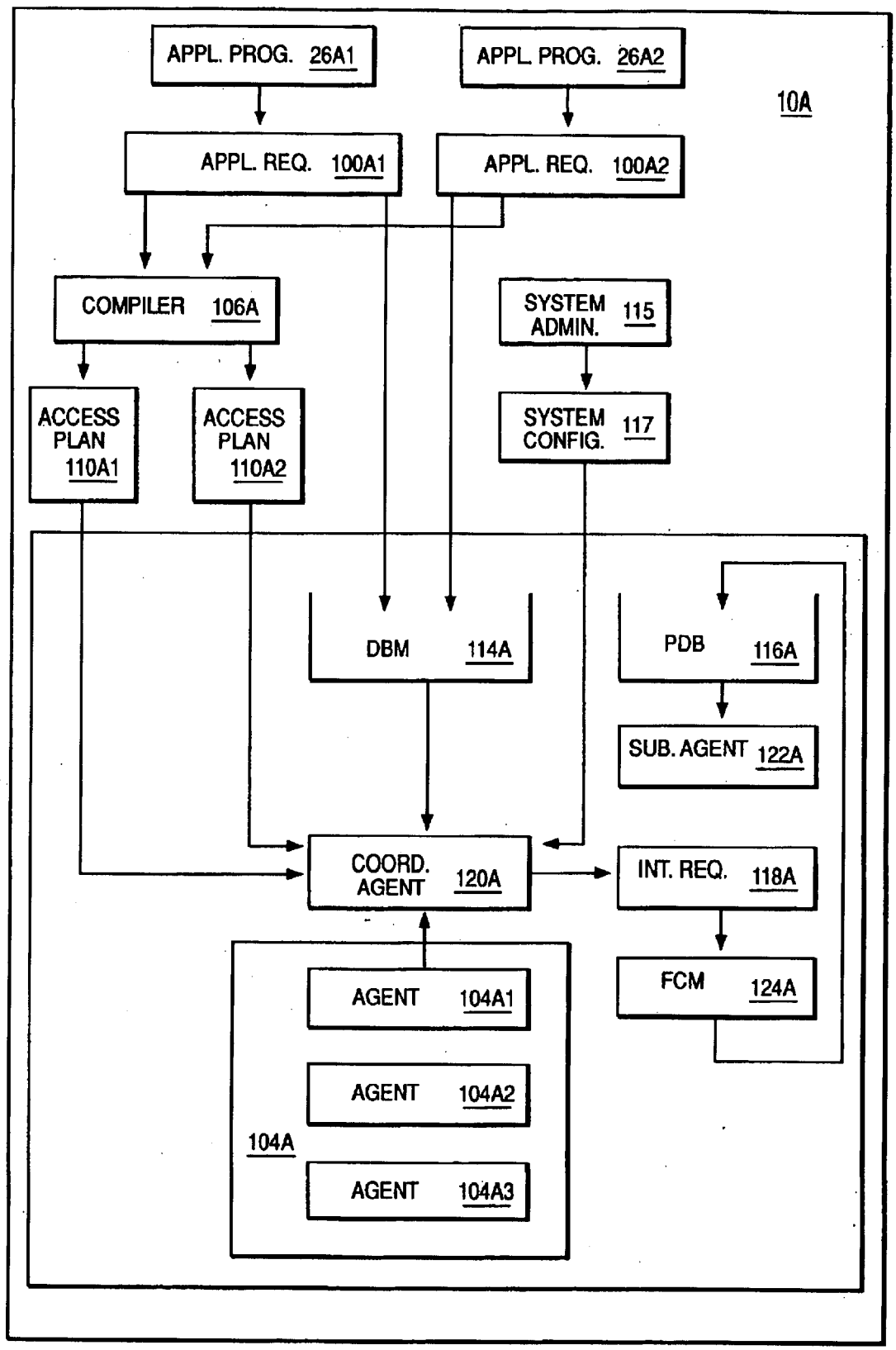
FIG. 4 illustrates interaction between an application program and a database manager program on one of the nodes, and shows a pool of agents and the database manager and parallel database queues with agents assigned to the queues.

Referring now to FIG. 4, a program, such as an application program 26A1 on node 10A, may generate an application request 100A1 which is a high level request such as in a standard language, like Structured Query Language, and is not specific to any particular data processing system or system configuration. A parallel processing management program 102A running on node 10A, has a pool 104A of concurrently executing processes (also referred to as "agents") 104A1, 104A2, etc. for handling such data processing application requests 100A1, 100A2, etc., including searching, sorting, storing and retrieving data from memory in the interconnected nodes 10A, 10B, etc. Similarly, other nodes 10B, 10C, etc. have programs 102B, 102C, etc. with pools of agents 104B, 104C, etc. In the preferred embodiment of the present invention the parallel processing management program 102 is a database management ("DBM") program for database processing, and the data processing application requests are database requests. The data which is stored in and retrieved from memory by the DBM program may include data which is organized in tables of related data. The data in a single table may be located in memory 18 or 24 on a plurality of nodes 10.

Figure 7:
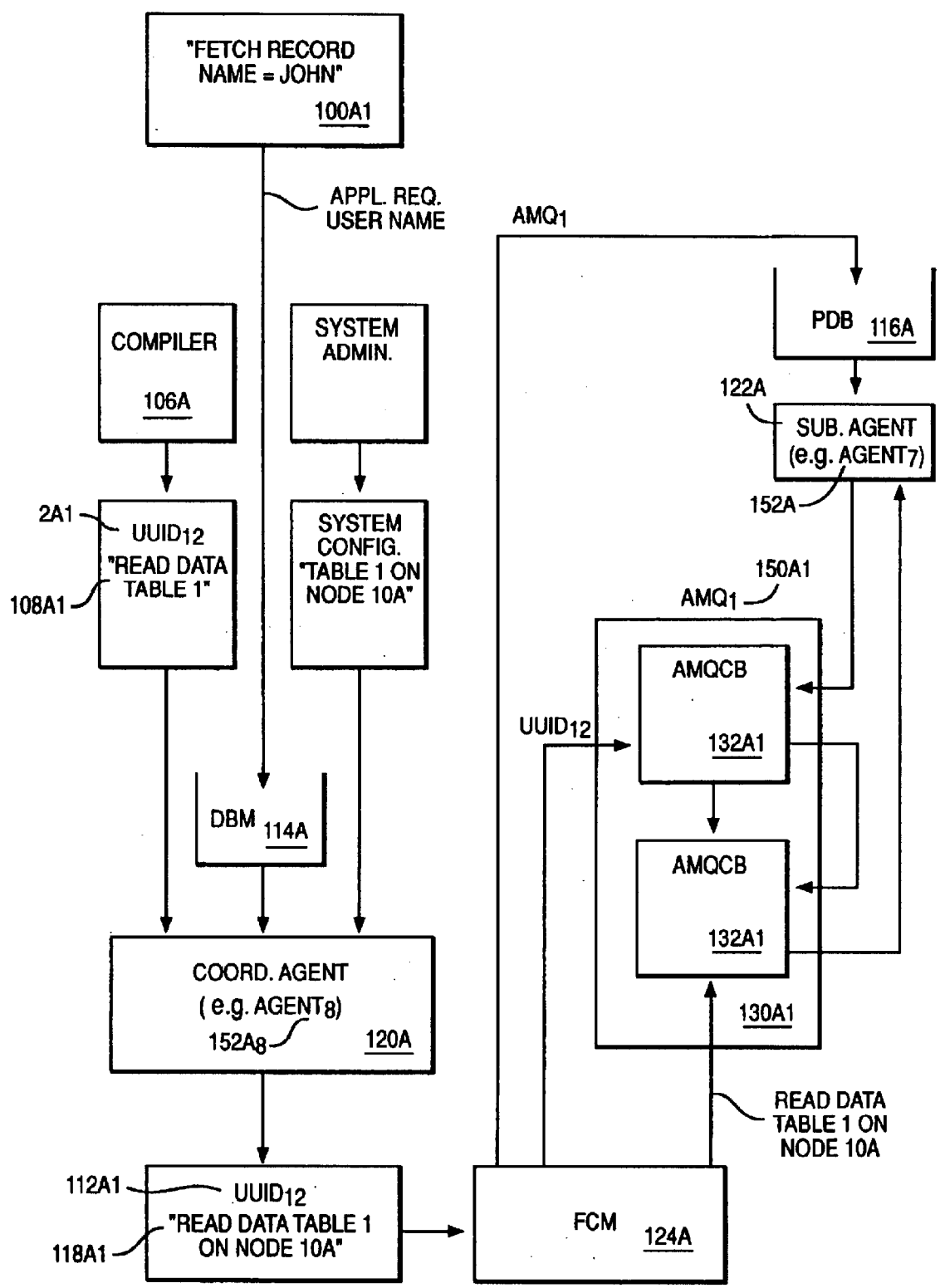
FIG. 7 shows a request being identified, stored, and passed among agents according to the system of queues and addressing.

Prior to run-time execution, the system administrator establishes a database node configuration which identifies the locations of data within the system. Also, as depicted in FIG. 7, application requests 100A are compiled by compiler 106A into low level requests 108A, such as in an assembly language. For example, an application request "Fetch record name=John" may be compiled into a number of low level requests:

load table john locate data of table 1 read data build data access table cursor control block etc.

For each application program 26A1, such as program 26A1 and program 26A2 shown, from which application requests, such as requests 100A1 and 100A2 shown, are compiled, an access plan, such as access plan 110A1 and access plan 110A2 shown, is established for storing low level requests, along with universal unique identifier numbers ("UUID's") 112A, which are assigned to the low level requests 108A. A UUID assignment does not determine which agent will handle a request because the agents themselves determine the initial assignment of a request to an agent, as will be described below. However, by assigning a second request to the same UUID as a first request, the compiler will cause the second request to be handled by the same agent that handled the first request, whichever agent that may have been. The compiler may select to assign two requests the same UUID, for example, in the case where the requests are for records from a common data table.

During run-time, a user application program 26A1 generates an application request 100A1 corresponding to one of the application requests 100A1 that has been compiled into low level requests 108A1. The DBM program 102A has a database manager queue ("DBM queue") 114A for storing application requests 100A and a parallel database queue ("PDB queue") 116A for internal requests 118A generated from the low level requests 108A. Request 100A1 is put into the DBM queue 114A along with the name of user that originated the request. An agent 120A assigned to DBM queue 114A from the pool 104A of agents 104A1, 104A2, etc. is assigned to a request 100A1. The low level requests 108A1 compiled from application request 100A1 are stored in a portion of the access plan 110A1 for the application program 26A1 which generated the request 100A1. The coordinating agent 120A assigned to the request 100A1 gets the low level requests 108A1 and combines them with addressing information from the system configuration and access authorization information derived from the system configuration and from the user name, thereby generating an internal request 118A for handling by an agent 122A assigned to PDB queue 116A from the pool 104A of agents 104A1, 104A2, etc.

All of the agents 104A1, 104A2, etc. in the pool 104A are capable of servicing either the application requests 100A from the DBM queue 114A or the internal requests 118A from the PDB queue 116A. While an agent is servicing a request from the DBM queue it is referred to as a "coordinating agent". While an agent is servicing a request from the PDB queue, the agent is referred to as a "subordinate agent".

Since the coordinating agent 120A provides addressing information and access authorization to the compiled requests 108A, the application program and the compiler may be independent of the system configuration, and a subordinate agent may process interval requests independently of the application users. Since the DBM program 102A, coordinate agent 120A, and subordinate agent 122A exchange only those requests which have been compiled from external application requests 100A1, 100A2, etc., and have been supplemented with access authorization, interagent communication does not require detailed error checking, such as that which a transport layer communications protocol ordinarily provides. The DBM program 102A therefore provides a fast communications process (referred to herein as the "fast communications manager" or "FCM") 124A with reduced error checking for coordinating communication between agents.

Figure 5:
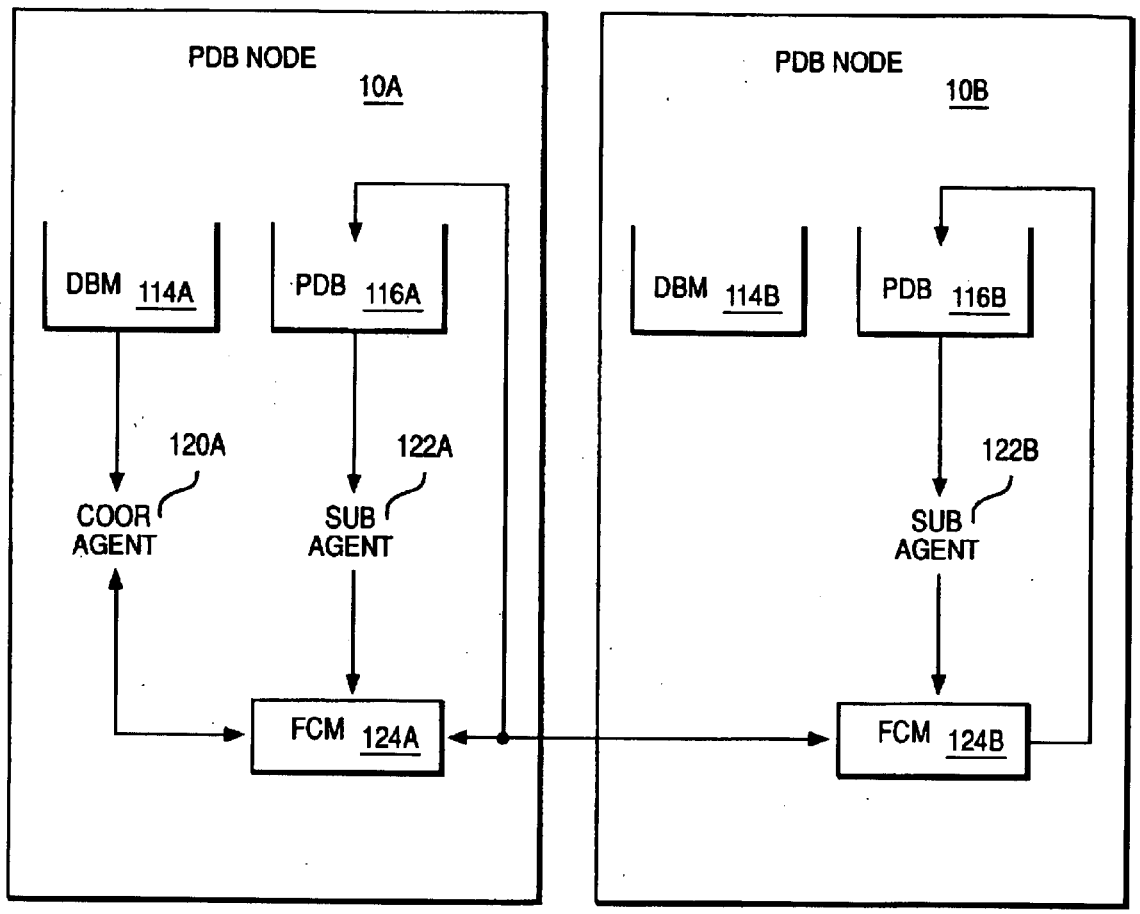
FIG. 5 shows two nodes and illustrates interagent communication within a node and between nodes.

Interagent communication is shown in greater detail in FIG. 5. Application requests 100A on node 10A are received by coordinate agent 120A and the resulting internal requests 118A. (FIG. 4) are communicated through FCM 124A to PDB queue 116A and, if a request 118A involves memory on node 10B, the request 118A is also communicated by FCM 124A to the node 10B FCM 124B, which puts the request 118A into the node 10B PDB queue 116B. After a subordinate agent 122B assigned to a PDB queue 116B has received a request 118A the agent 122B may communicate information about the request 118A to its FCM 124B. The FCM 124B communicates through FCM 124A to agent 120A on the node 10A where the request originated.

Data required for an application request, such as application request 100A1 on node 10A, may be located on a number of nodes, such as nodes 10B and 10C. A number of internal requests 118A may be generated on the originating node 10A. A first internal request 118A, generated from the application request 100A1, may then be sent to one node 10B, while a second internal request 118A, generated from the application request 10A1, is sent to the other node 10B, so that a subordinate agent 122B on node 10B may process the first internal request 118A, while another subordinate agent 122C may process the second internal request 118A.

Figure 6:
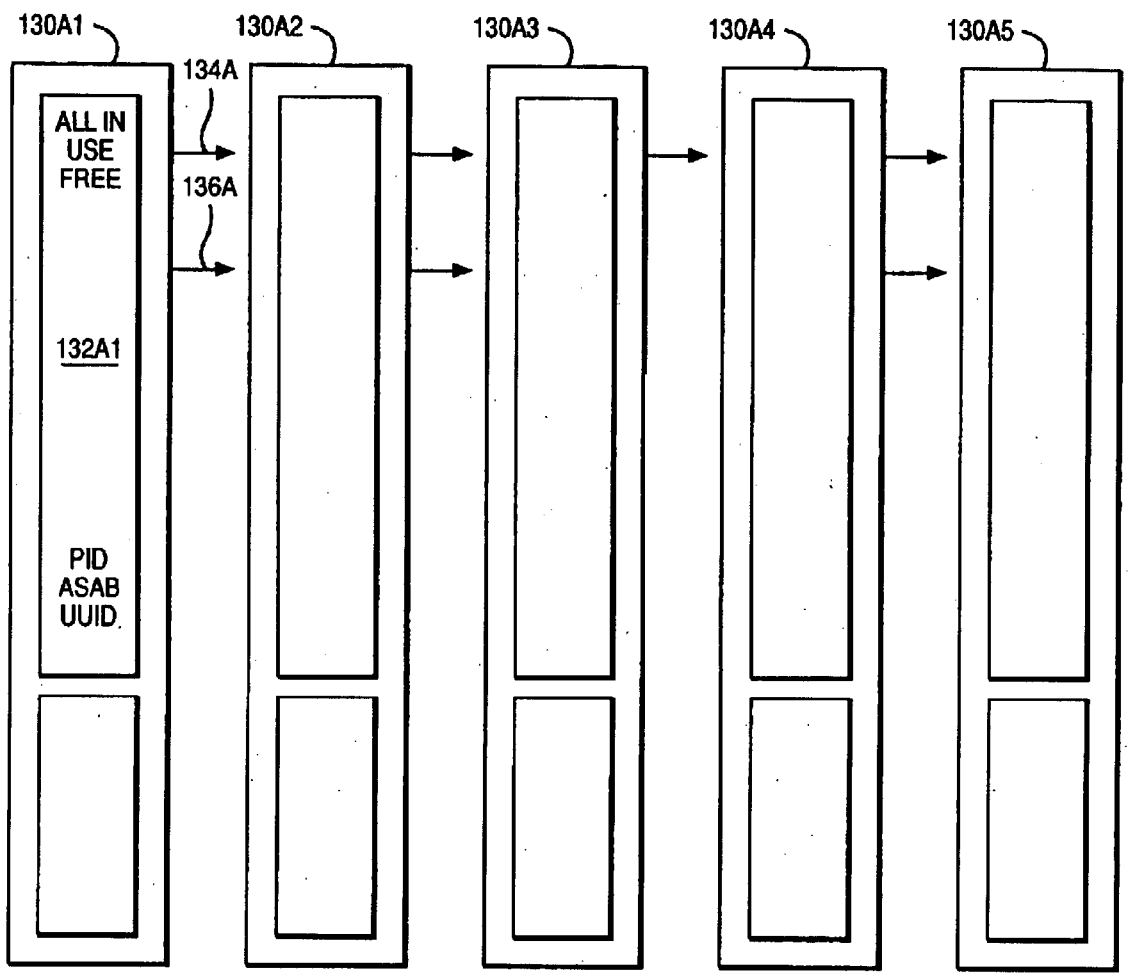
FIG. 6 illustrates agent message queues and agent message queue control blocks for one of the nodes.

The DBM program 102A also reserves a portion of memory, referred to as the FCM shared memory, for sharing among agent and communication processes. Referring now to FIG. 6, part of the FCM memory is established as queues, referred to as agent message queues ("AMQ's") 130A1–A5, for holding messages between agents. The FCM establishes an agent message queue control block ("AMQCB") 132A1 within an AMQ 130A1. An AMQCB may be addressed by a communications handle which the DBM program assigns to the AMQCB on start up.

The AMQCB's are linked together in several ways. The first set of links 134A connect all the AMQCB's. The second set 136A connects the AMQCB's 132A for AMQ's 130A which do not have any agent messages and are not assigned to an agent. These AMQ's 130A linked by the second set of links 136A are referred to as the "free" AMQ's. The third set of links 138A connects the AMQ's which are busy. By referring to these links 134A, 136A, and 138A an agent may determine the status of an AMQ 130A.

The number of AMQ's 130A may be established by the network administrator as a fixed number, or a range for the number of AMQ's may be set and the number may be automatically adjusted by the database manager program. Automatic adjustment of the number of AMQ's is further described below.

Returning now to the description of agent message processing, after initialization, as shown in FIG. 4, requests 100A and 118A are serviced by the agents 104A. Messages are identified and stored for passing among agents according to the following system of queues and addressing (as illustrated in FIG. 7). An AMQ 130A1 is designated for a particular request 118A1 and related subsequent requests by storing the request's UUID 112A1 in the AMQCB 132A1 of the AMQ 130A1 so that the AMQ 130A1 may be located by reference to the UUID 112A1. That is, for example, after a coordinating agent 120A generates an internal request 118A, the FCM 124A processes the internal request 118A1, which includes the FCM putting the internal request 118A into an AMQ 130A1, putting the request's UUID 112A1 into the AMQ's AMQCB 132A1, and putting the communication handle 150A1 for the AMQCB 132A1 into the PDB queue 116A. Referring now to FIG. 6, in selecting an AMQ 130A1 for an internal request 118A1, the FCM 124A searches among the AMQCB's 132A4 and 132A5 of the busy AMQ's 130A4, and 130A5 attempting to find the UUID 112A1, of the internal request 118A1. If the FCM 124A finds the UUID 112A1 in an AMQCB 132A4 or 132A5, the FCM 124A puts the request 118A1 into the associated AMQ 130A4 or 130A5. Otherwise, the FCM 124A puts the request 118A1 into a free AMQ 130A1, 130A2 or 130A3.

Referring again to FIG. 7, once an application request 100Al has been received, one or more corresponding internal request 118A1 has been generated from the low level requests 108A1, and the internal requests 118A1 have been put into one or more AMQ 130A1, then, when an agent 122A that is seeking to service an internal request 118A1 checks the PDB queue 116A, the agent 122A detects the communications handle 156A1 in the. PDB queue 116A and thereby determines that a request 118A1 is waiting. The agent 122A uses the communications handle 150A1 to address the AMQCB 132A1, into which the agent puts its PID 152A7 and from which the agent 122A gets the address of the request 118A in the AMQ 150A1. The agent then addresses the AMQ 150A1 and gets the internal request 118A.

Figure 8:
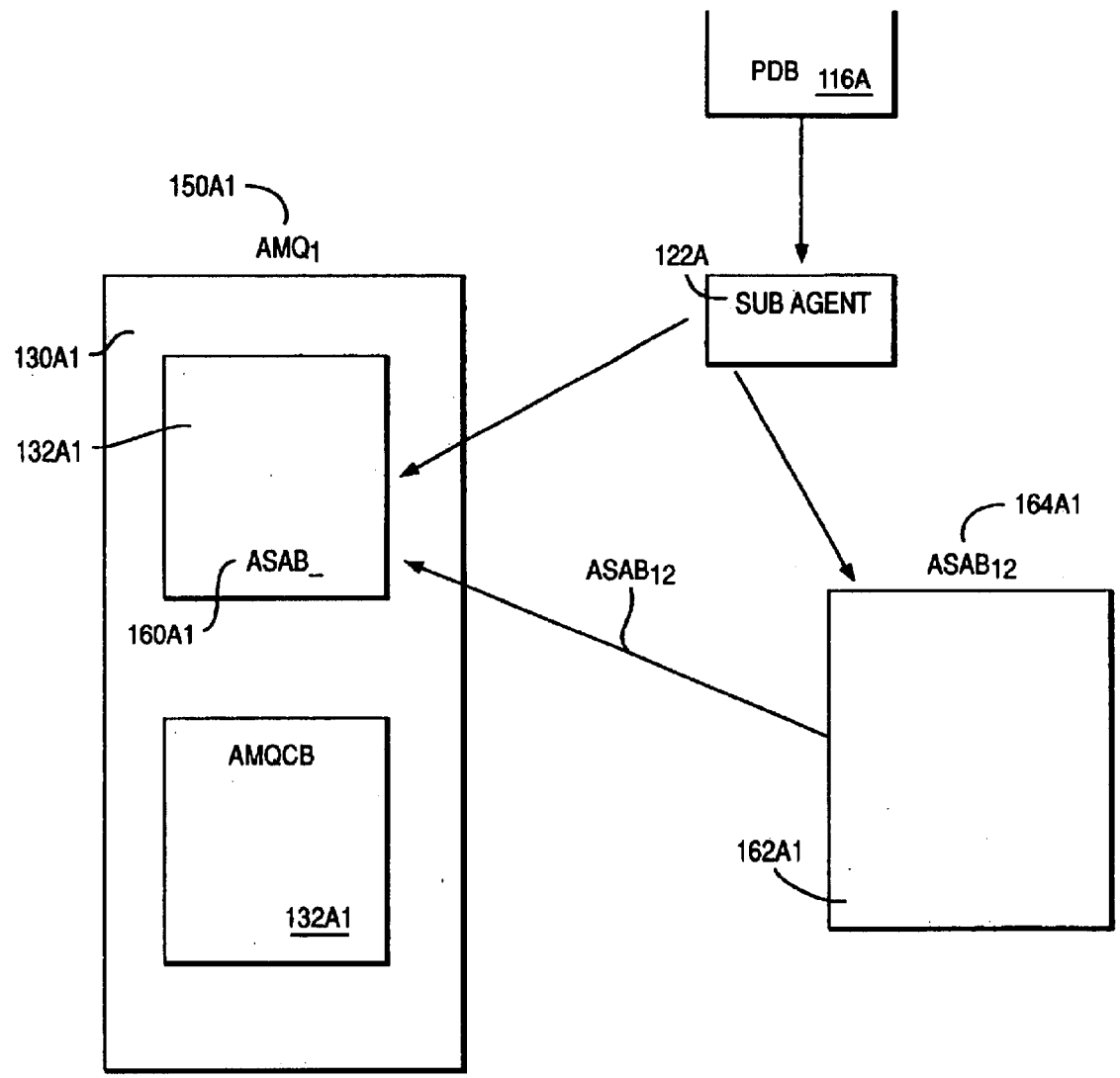
FIG. 8 shows an agent setting up an application state anchor block.

Since a single application request 100A1 may be decomposed into a number of internal requests 108A1 to be executed concurrently, a means is also provided for recording information about the state of the application request 10A1. As shown in FIG. 8, a subordinate agent 122A taking an internal request 118A tests to see whether a data structure, referred to as an application state anchor block (ASAB), has been established for that request. This is tested by looking for an ASAB address 160A1 in the AMQCB 132A1 for the AMQ 130A1 of the request. If an ASAB has not yet been established, the agent establishes the ASAB 162A1 and then stores information about the state of the application request 100A1 from which the internal request 118A derives in the ASAB 162A1. The information stored in the ASAB 162A1 includes the user name, database name, and database state, (including, for example, the cursor location in a database table). The agent also puts the address. 164A1 for the ASAB 162A1 into the AMQCB 132A1 for the AMQ 130A1 which the agent 122A is servicing. If the internal request 118A is subsequently processed by other agents 104A1, 104A2, etc. (FIG. 4), when an agent 104 tests to see whether an ASAB 162A1 has been established, the agent 104 will find the ASAB address 164A1 in the AMQCB 132A1 and will thereby determine that an ASAB 162 has been established.

General Description of Load Control

A token scheme limits the number of agents which may process requests concurrently. That is, a network administrator sets the total number of tokens available and an agent must get a token in order to process a request. Variations on this scheme are contemplated wherein different tokens have different priority values so that throughput or response time may be optimized based on historical input/output activity and processor load. An agent may return its token either upon finishing processing or when the agent suspends processing temporarily, such as while waiting for a resource.

General Description of Expandable Agent Pool

A network administrator sets an initial number of agents in 104A1, 104A2 . . . 104B1, 104B2 . . . etc. the pools of agents 104A, 104B, etc. for each node and sets a target minimum number of agents in each pool. Thereafter, the number of agents in the pools may be automatically increased or decreased by the DBM program 102. When all the agents 104 are processing requests 118, and an additional request is received, a new agent 104 is automatically created, provided that enough tokens are available. If, when an agent 104 finishes processing a request 118, there are more agents 104 than the initial number, and if an analysis of the history of requests provides a certain indication, then an agent 104 will terminate itself. The analysis of the history of requests functions to dampen the termination of agents 104. It has a particularly significant effect to terminate an agent 104 when the number of agents 104 is near the minimum number.

Categories of Agents

Figure 9:
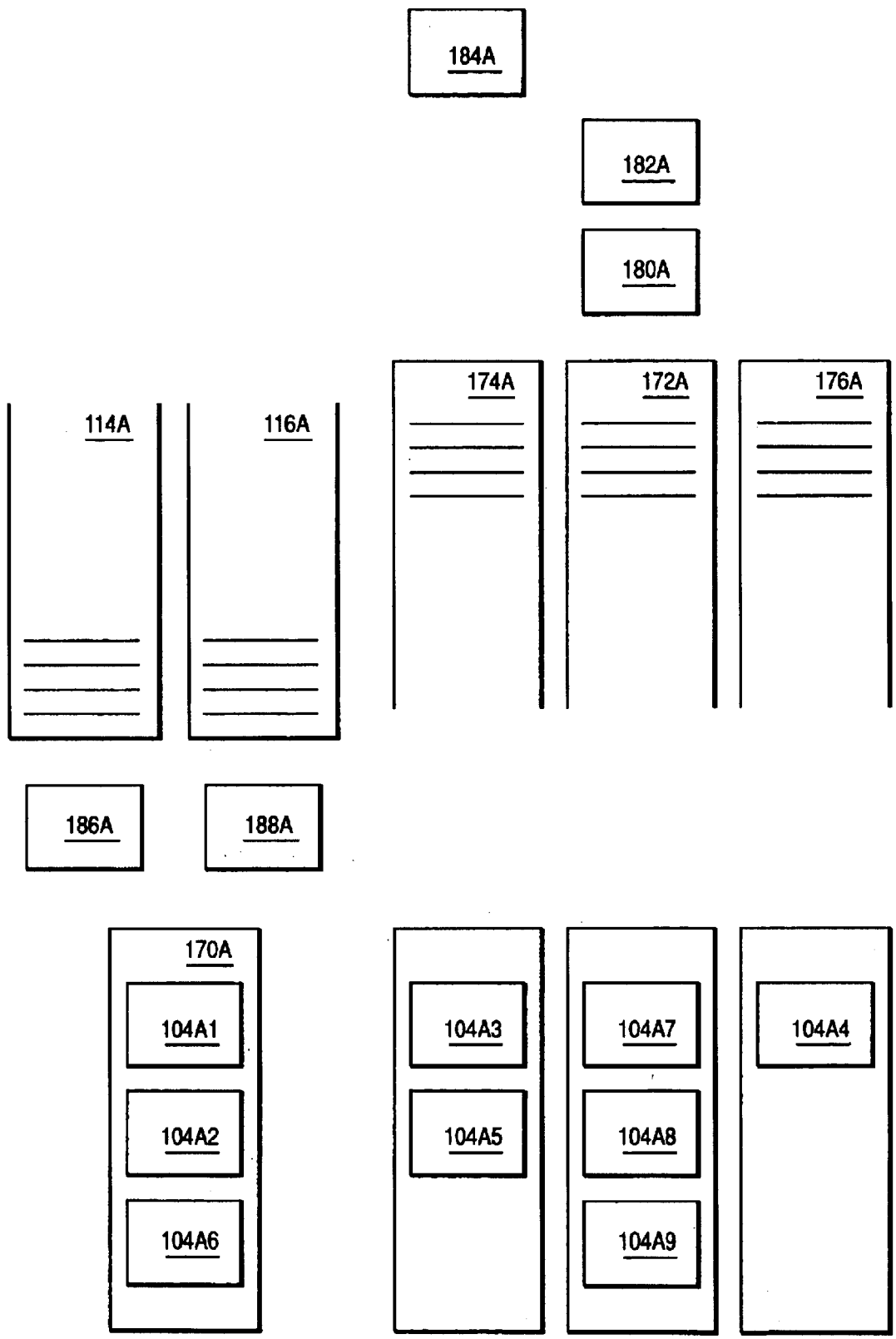
FIG. 9 shows categories of agents and shows counters used in coordinating the agents.

Referring now to FIG. 9, there are four categories of agents 104. First, there is the category of agents which are actively processing a request, or "active" agents 170. In this example, for node 10A there are nine agents 104A1 through 104A9, and attached agents in the other three categories are organized in queues. One queue, the free agent queue 172, is of "free" agents which are waiting for a request. In this example, agents 104A7 through 104A9 are shown as agents in the free agent queue 172A. Another queue, the resume agent queue 174, is of "resuming" agents. In this example, agents 104A3 and 104A5 are shown as agents in the resume agent queue 174A. An agent in the resume agent queue 174A has a request, is not waiting for a resource or event, but is waiting for a token to allow it to begin processing the request. Finally there is the category of blocked agents 176. In this example, agent 104A4 is shown as an agent in the blocked agent queue 176A. An agent in the blocked agent 176A queue has a request but is waiting on a dependency to be resolved, that is, it is waiting on a resource or event. Each agent has an Agent Control Block ("ACB") (not shown) with a flag (not shown) indicating whether an agent is in an active, wait, or sleep state. The free agent queue 172 and resume agent queue 174 are implemented in the DBM program. The blocked agent queue 176 is implemented at the operating system level.

Counting Agents and Tokens

As previously described, the overall number of agents 104 and of tokens may be increased or decreased automatically. Since agents may be created and terminated an "Agent_count" variable 180A is provided for keeping an account of the total number of agents and a "Min_count" variable 182A is provided for defining the minimum allowable number of agents 104A. Upon start-up, the DBM program creates a number of agents for the pool of agents according to the initial value of Agent_count. Agent_count 180A is incremented or decremented when an agent 104A is created or terminated.

A "Token_count" variable 184A is provided for keeping an account of the number of tokens available and in use. The initial value of Token_count 184A is set by the network administrator to establish the maximum number of tokens. Token_count 184A is decremented if the overall number of tokens is reduced for load control purposes or when an agent 104A takes a token in servicing a request 118A. It is incremented if the number is increased for load control or when an agent 104A gives up or completes a request 118. The minimum allowable value of Token_count 184A is 0.

Queue Structures

For security purposes, the DBM queue 114A is implemented as a system message queue for security purposes. The other queues 116A, 172A, 174A, and 176A may be implemented in shared memory.

The queuing policy varies among the queues. The DBM queue 114A has first-in first-out ("FIFO") queuing. The PDB queue 116A may have FIFO queuing, or, in order to group requests 118A from a transaction together, it may have priority queuing, such as based on a transaction timestamp or on a request identifier. The resume agent ("RA") queue 174A could be FIFO based, but preferably subordinate agents will be given priority over coordinate agents so that internal requests 118A are expedited relative to low level requests 108A.

The DBM and PDB queues 114A and 116A each have a Boolean flag 186A and 188A that indicate whether an agent 104A is waiting for a request from that queue. The DBM flag 186A is referred to as the "DMB_queue_stat." The PDB flag 188A is referred to as the "PDB_queue_stat." One agent, and only one agent may wait for a request 108A from the DMB queue 114A (see coordinate agent 120A, FIG. 4). Likewise, only one agent may wait on the PDB queue 116A (see subordinate agent 122A, FIG. 4).

Getting a Request ("Get_Request")

When an agent is created or when an agent is "waked up" (see below), the agent seeks to service a request. First, the agent latches the PDB_queue_stat flag, and then the agent checks the value of the PDB_queue_stat flag. If the flag indicates that no other agent is waiting on the PDB queue, the agent (call it the "first" agent) unlatches the PDB_queue_stat flag and waits on the PDB queue. If the flag indicates that another agent is waiting, the first agent unlatches the PDB_queue_stat flag and then latches and checks the value of the DBM_queue_stat flag. If no agent is waiting, the first agent unlatches the DBA_queue_stat flag and waits on the DBM queue. If another agent is waiting, the first agent unlatches the DBA_queue_stat flag and then returns to the free queue and sets its own ACB flag forcing the agent to sleep. Once the agent is in the sleep state the operating system may allocate fewer resources to the agent.

The above described Get_Request routine is further illustrated in the following pseudo code:

```
Get-Request:
    latch PDB_queue_stat
    if PDB_queue_stat == 0
        PDB_queue_stat = 1
        unlatch PDB_queue_stat
        (blocking) receive on PDB_req_queue
    else
        unlatch PDB_queue_stat
        latch DBM_queue_stat
        if DBM_queue_stat == 0
            DBM_queue_stat = 1
            unlatch DBM_queue_stat
            (blocking) receive on DBM_req_queue
        else
            unlatch DBM_queue_stat
            add agent to Free_agent_queue
            wait on agent flag
            Get_Request /* or, goto Get_Request (i.e., retry) */
        end if
    end if
End Get_Request
```

Waking Up Another Agent ("Wakeup_Free_Agent")

As previously described, when a request arrives in the DMB queue or the PDB queue, the FCM puts a AMQCB handle in the queue. When an agent waiting on the PDB or the DBM queue detects the handle in the queue the agent attempts to wake up another agent in the free agent queue by signalling the free agent's flag. If there are no agents in the free agent queue, the first agent checks the Token_count flag. If the value of Token_count exceeds 1, so that there will be a token available even after the first agent takes a token, the first agent creates another new agent.

The Wakeup_Free_Agent routine is further illustrated by the following pseudo code:

```
Wakeup_Free_Agent:
    if (Free_agent_queue not empty)
        signal first agent on Free_agent_queue
    else
        if (Token_count > 1)
            create new agent
            latch Agent_count
            Agent_count++
            unlatch Agent_count
        end if
    end if
End Wakeup_Free_Agent
```

Getting a Token ("Get_Token")

After a first agent has gotten a request and attempted to wake up another agent, the agent then attempts to get a token. Once the agent has a token it begins processing the request. The agent attempts to get a token according to the following routine:

```
Get_Token:
    latch Token_count
    if Token_count > 0
        Token_count-1
        unlatch Token_count
    else
        add agent to Resume_agent_queue
        unlatch Token_count
        wait on agent's flag
        Get_Token   /* or, goto Get_Token (i.e, retry) */
    end if
End Get_Token
```

Processing the Request and Releasing the Token ("Release_Token")

Upon getting a token, the agent begins processing the request. If the agent suspends processing of the request, such as while waiting on a resource or event, then after a predetermined period of time the agent will give up its token and attempt to notify an agent on the resume agent queue. Also, when the agent completes processing of the request, the agent will give up its token and attempt to notify an agent on the resume agent queue. These operations where a token is released are described further in the following pseudo code:

```
Release_Token:
    latch Token_count
    Token_count++
    unlatch Token_count
    if Resume_agent_queue not empty
        post flag for first agent on Resume_agent_queue
    end if
End Release_Token
```

Freeing the Agent ("Free_Agent")

After the agent has released its token and completed its assigned request, the agent frees itself. First, the agent compares the value of Agent_Count with that of Min_count, to see if the number of agents now exceeds the predetermined minimum number of agents. If Agent_Count exceeds the minimum then, unless a damping function preempts, the agent process terminates, thereby releasing resources which are dedicated to the agent. If the agent does not terminate, either because the Agent_Count is less than the minimum number, or because the damping function preempts termination, then the agent reinitializes itself and enqueues itself in the free agent queue. This routine is further illustrated in the following pseudo code:

```
Free-Agent:
    latch Agent_count
    if ( Agent_count > target minimum and
            damping_conditions are not met )
        Agent_count-1
        unlatch Agent_count
```

-continued

```
        destroy agent     /* this call will not return */
    else
        unlatch Agent_count
        reinitialize agent data structures
    end if
End Free_Agent
```

If an agent is suspended for a blocking operation (i.e., to wait for a resource or an event) and the agent releases its token, the agent must be waked up when the blocking operation is resolved. The agent then most enqueue in the resume agent queue, get a token, complete the request, release the token, and free itself. This is provided for in the following pseudo code:

```
Wakeup_Blocked_Agent:
    Get_Token
    complete request
    Release_Token
    Free_Agent
End Wakeup_Blocked_Agent
    Agent Pseudo Code
    The agent process combines the above routines as follows:
Agent:
    loop:
        Get_Request
        Wakeup_Free_Agent   /* to get the next request */
        Get_Token
        do request
        Release_Token
        Free_Agent    /* doesn't return if agent terminates */
    end loop
End Agent
```

What is claimed is:

1. A method for allocating computer processing resources on a node among a number of concurrent processes ("agents") which share the resources for processing a number of requests, comprising the steps of:

creating a certain number of agents on the node;

assigning a first request to a first agent for processing of the request;

creating a certain number of tokens;

assigning a token to each agent having an assigned request; and limiting the number of agents which may concurrently process request by preventing an agent from processing a request unless the agent has an assigned token.

2. The method of claim 1 further comprising the steps of:

enqueuing a second agent in a resume agent queue when the second agent is assigned a request and a token is not available so that the second agent may await notification of an available token;

releasing the assigned token by the first agent when the first agent completes the assigned request so that the token may be reassigned to an agent having a request to process; and notifying the second agent by the first agent, if the first agent releases the token.

3. The method of claim 2 further comprising the steps of:

releasing the assigned token by the first agent when the first agent suspends processing of a request, if the duration of the suspension has exceeded a certain time limit, wherein the suspension is due to the agent waiting for a certain resolution;

notifying the second agent in the resume agent queue by the first agent when the first agent releases the token; and enqueuing the first agent in the resume agent queue after the resolution, if the first agent has released its assigned token.

4. The method of claim 1 further comprising the step of creating an additional agent after assigning tokens to agents having assigned requests, if an existing agent is not available to wait for a request, and an unassigned token is available for the additional agent.

5. The method of claim 4 further comprising the steps of:

defining a certain minimum number of agents;

automatically eliminating an agent when the agent completes a request if the number of agents that are assigned tokens exceeds the minimum number of agents.

6. The method of claim 5 wherein an agent is not automatically eliminated unless a certain damping condition is also met.

7. A method for allocating computer processing resources on a node among a number of concurrent processes ("agents") which share the resources for processing a number of requests, comprising the steps of:

creating a certain number of agents;

assigning a request to an agent for processing of the request;

creating a certain number of tokens;

assigning a token to a first agent having an assigned request;

limiting the number of agents which may concurrently process requests by preventing an agent from processing a request unless the agent has an assigned token;

enqueuing a second agent in a resume agent queue when the second agent is assigned a request and a token is not available so that the second agent may await notification of an available token;

releasing the assigned token by the first agent when the first agent completes the assigned request so that the token may be reassigned to an agent having a request to process;

notifying the second agent by the first agent, if the first agent releases the token;

creating an additional agent after assigning the token to an agent, if another agent is not available to wait for a request, and an unassigned token is available for the additional agent;

defining a certain minimum number of agents; and automatically eliminating an agent when the agent completes a request if the number of agents that are assigned tokens exceeds the minimum number of agents.

8. A computer system including a plurality of processors for allocating system resources among a number of agent Processes which share the system resources for processing a number of requests, comprising:

a plurality of agent,processes in a system memory;

means for assigning a request to a first agent process for processing of the request;

a plurality of tokens in the system memory;

means for assigning a token to the first agent process; and means for limiting the number of agent processes which may concurrently process requests by preventing an agent process from processing a request unless the agent process has an assigned token.

9. The system of claim 8 further comprising:

an agent process queue in which agent processes which are assigned requests but lack tokens are queued so that the agent processes may await notification of an available token; and means for reassigning the assigned token to a queued agent process when the first agent process completes its assigned request.

10. The system of claim 9 further comprising:

means for reassigning the assigned token to a queued agent process when the first agent process suspends processing of a request, if the duration of the suspension has exceeded a certain time limit, means for enqueuing the first agent process in the agent process queue.

11. The system of claim 8 further comprising means for creating an additional agent process after assigning the token to the first agent process, if an existing agent process is not available to wait for a request, and an unassigned token is available for the additional agent process.

12. The system of claim 11 further comprising:

means for automatically eliminating an agent process when the agent process completes a request if the number of agent processes that are assigned tokens exceeds a defined minimum number of agent processes.

13. The system in claim 8 further comprising:

a plurality of processor units in each of which a respective one of the plurality of processors is housed and further including a memory and an input/output port; and a network coupled to each of the input/output port to provide communication paths between the plurality of processors.

* * * * *